Figure 1:
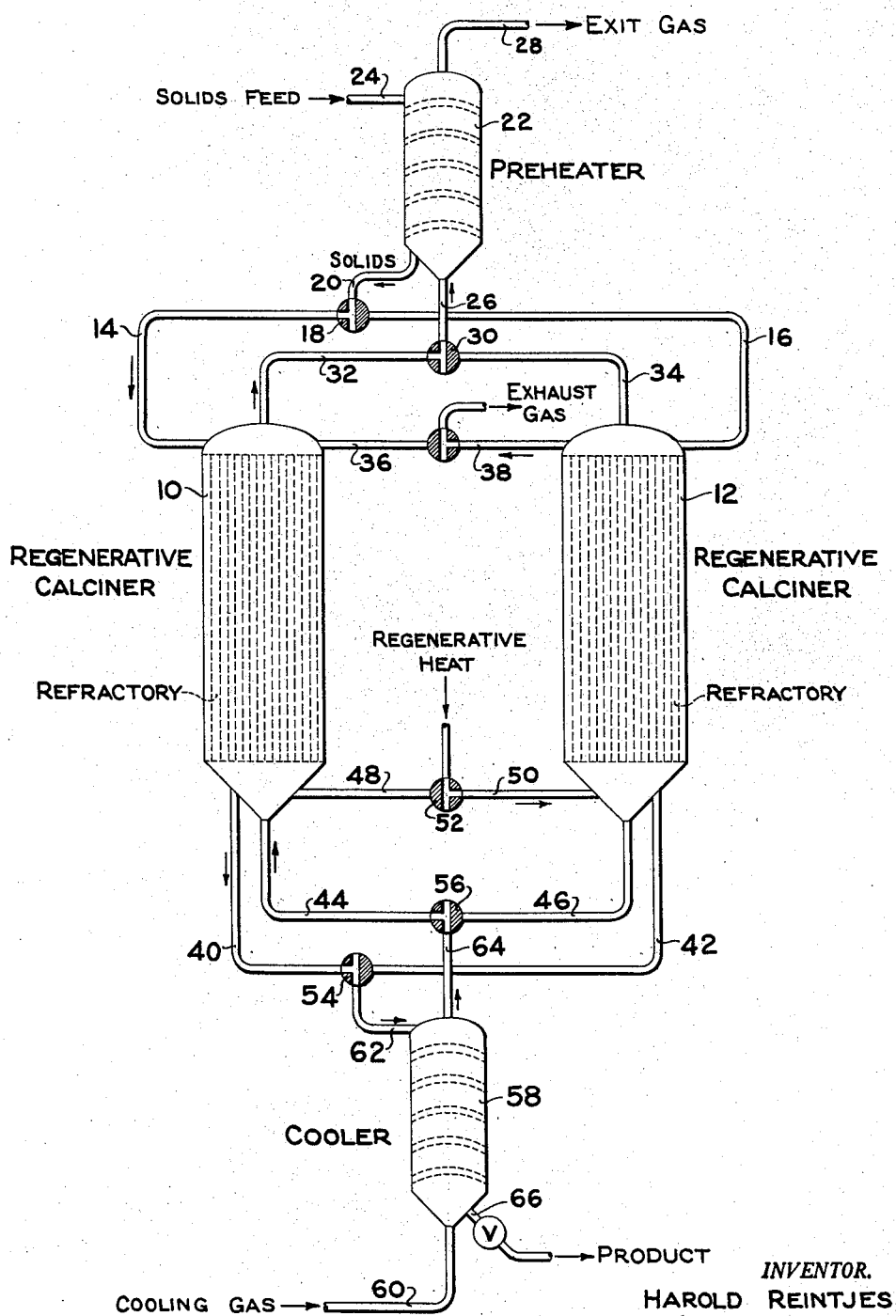

INVENTOR.
HAROLD REINTJES

United States Patent Office 2,914,448
Patented Nov. 24, 1959

2,914,448

PROCESS FOR HEAT TREATING PARTICULATE SOLID MATERIALS

Harold Reintjes, Short Hills, N.J., assignor to Godfrey L. Cabot, Inc., Boston, Mass., a corporation of Massachusetts Application December 29, 1954, Serial No. 478,455

12 Claims. (Cl. 202—12)

This invention relates to an improved process for heat treating particulate solids, especially for carrying out such treatment at exceptionally high temperatures. It is particularly adapted to the heat treatment of carbonaceous materials, but can be employed for heat treating any suitable solid material which is free flowing or fluidizable.

Various processes are known for the heat treatment, or calcination, of solid materials. For example, such calcination may be carried out in rotating drums, refractory furnaces and the like, heated internally by hot combustion product gases or externally by transmission of heat through the calciner walls. However, when the calciner is heated internally or directly, there are many disadvantages, particularly if the material being heated is finely divided carbon or solid hydrocarbon. Some of the more important disadvantages are: loss of product due to mechanical means, as by entrainment in the heating gases, reaction losses due to reaction with components such as $CO_2$ and water vapor of the heating gas, and loss of valuable volatile matter present in the solid feed material being calcined. When the calciner is heated externally the amount of heat made available to the charge is limited by the ability of the materials of construction to withstand high temperatures and to transmit heat through the walls to the interior.

Because of the relatively high product and by-product loss resulting from direct calcination of certain materials, notably solid carbons, it is preferred to calcine such materials in a closed system such as that described in copending application of Hughes et al., Ser. No. 455,-532, filed September 13, 1954. As good as the apparatus of that invention is, it is limited in operating temperature and throughput capacity for certain types of heating operations by reason of its materials of construction. In other words, the shaft should preferably be formed of refractory having high thermal conductivity, the best of which is silicon carbide. But at temperatures above about 2200° F., the binder materials used in the formation of the silicon carbide brick are susceptible to attack by certain forms of sulfur vapor, nascent hydrogen and the like, which may be encountered during the calcination of carbonaceous materials. When a carbonaceous material such as green petroleum coke is heated to calcining temperature, nascent hydrogen is released during the decomposition of hydrocarbon materials; also when sweep gas containing hydrogen and/or hydrocarbon gases is utilized, a varying amount of nascent hydrogen is formed which at high temperature combines with and carries off the binder material—a notable example being silica—ultimately destroying the brick. Similar results occur, only to a greater extent, when high sulfur-content carbon is calcined at such high temperatures.

It is the principal object of my invention to provide an improved process for heat treating particulate solid materials.

It is another object of my invention to provide a novel process for heat treating particulate solid materials under non-contaminating conditions at higher temperatures than have heretofore been successfully attainable.

It is a specific object of my invention to provide a novel process for calcining carbonaceous materials, particularly high sulfur content petroleum coke.

Briefly, the process of this invention comprises flowing the material to be treated in particulate solids form in a gaseous atmosphere through the vertically disposed, refractory lined flues of a suitably constructed regenerative calciner, the walls of which flues have previously been heated to the selected treating temperature. The charge material is continuously flowed through these flues until its temperature at discharge falls to a predetermined minimum value, after which charge flow is discontinued and the flue walls are reheated internally, as by burning a combustible fuel therein. An additional feature of this invention comprises flowing a suitable gas first through the treated material to cool it and preheat the gas, then through the treating zone to sweep or treat the charge and further heat the gas, and then through fresh, untreated charge material to preheat it. This sweep gas may be any gas which is compatible with the charge, i.e., is substantially inert thereto or is suitable for treating the charge material.

The calciner employed in the practice of the process of this invention may be of somewhat conventional design wherein it is composed of vertical refractory flues. The flues may be constructed of checker brick, or of large unit refractory slabs, mounted in line to provide an unobstructed conduit. In other words, it is essential that completely open straight through passages be provided. Means are provided for intermittently heating the refractory in the calciner internally and it is the stored heat thus provided which treats the charge material. Since the process is cyclic it is ordinarily preferable to employ at least two calciners as a unit so that while one calciner is on load the second can be heated and vice versa.

The charge material may either be caused to fall freely through the flues for treatment in a manner similar to that disclosed in the copending application of myself and Hughes, Ser. No. 450,209, filed August 16, 1954, or it may be maintained as a slowly moving column supported at the bottom, or it may be handled as a fluid bed in accordance with known techniques, or it may be conveyed by the hyperflow principle as described in October 1954, "Petroleum Refiner," pp. 153–157. As there described "hyperflow" is a particulate solids conveyance system in which pressure is transmitted by each particle pressing on those surrounding it. Thus the particles move as a mass under the force of pressure imposed behind the mass rather than as a dispersion in a lifting gas. Consequently the bed of solids moves similarly to a bed of solids in a gravity flow line. By proper arrangement of the refractory brick and control of the feed to the unit, it is possible to utilize any two or even all of the types of solids movement suggested in the same operation. It will be seen that by such arrangement the length of treating time can be selected as desired to encompass a wide range of materials and extent of treating.

Figure 2:
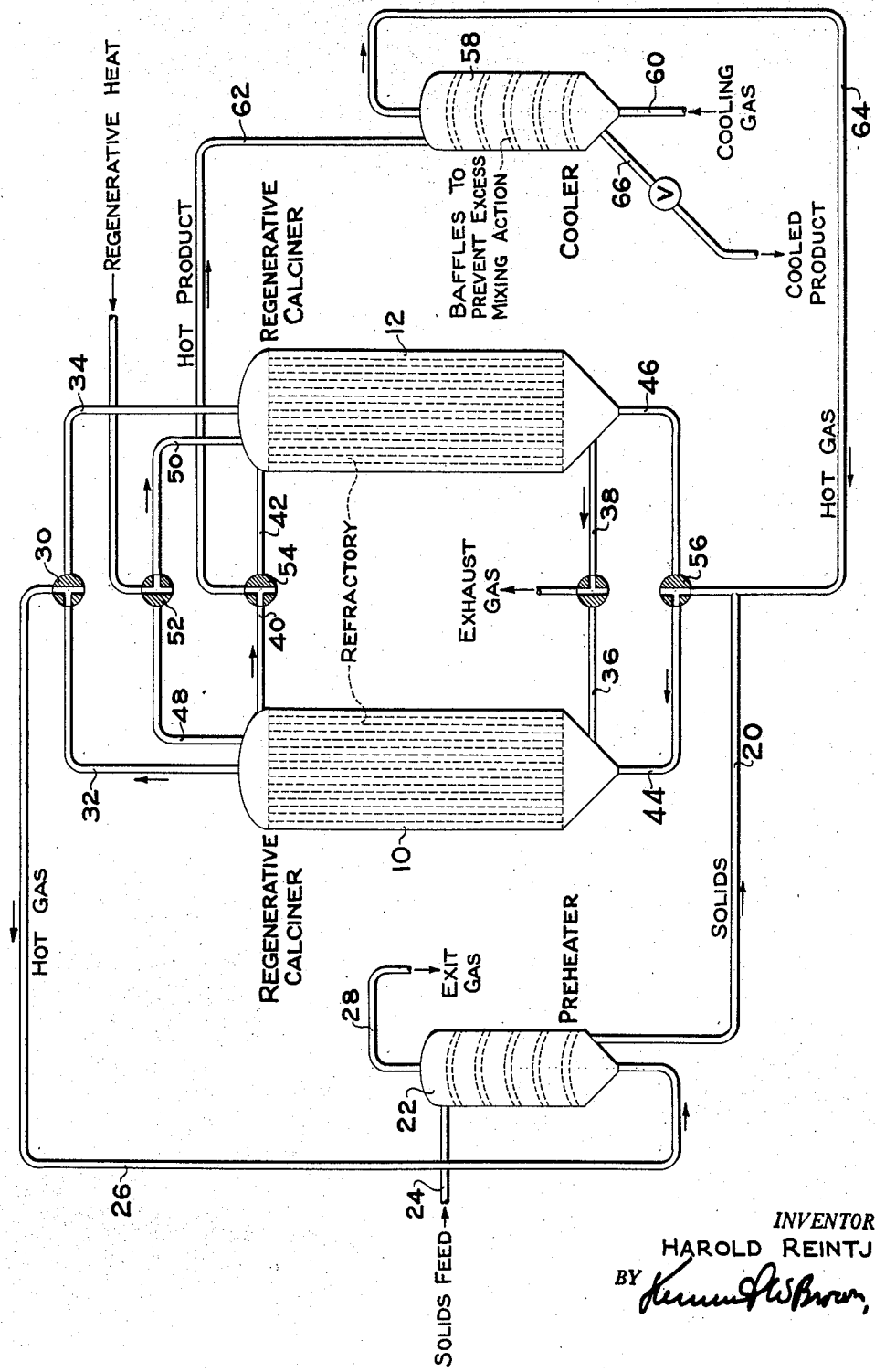

My invention will best be understood and appreciated from the following description thereof taken in connection with the accompanying drawings in which:

Fig. 1 is a diagrammatic representation of suitable apparatus for carrying out the process of this invention, primarily adapted to down flow of material but which may be employed for all types of solids flow, and Fig. 2 is a diagrammatic representation of apparatus adapted primarily for fluid bed type solids flow in practicing the process of the invention.

Referring first to Fig. 1, the heart of the apparatus consists of a pair of regenerative calciners 10 and 12 containing a plurality of refractory brick flues of relatively small cross section. Since these flues are heated internally, it will be noted that the thermal conductivity of the wall does not control the choice of refractory material for this application. Thus, where high temperatures are required in a highly corrosive atmosphere, refractory brick most suitable for the operation may be used so that treating temperatures up to 2600° F. and even higher may be attained.

Connected into the upper area of calciners 10 and 12 are charge conduits 14 and 16 stemming from a 3-way valve 18. A single conduit 20 joins valve 18 and preheater 22. This preheater has a charge inlet 24, a hot gas inlet 26, and an exhaust gas outlet 28.

Preheater 22 may be of any conventional design. The preferred type is that provided with a series of internal baffles which somewhat hinder the downward flow of charge material and provide excellent and intimate contact between the charge material and heating gas. Thus, the hot gas enters the preheater through inlet 26 at the bottom, flows up through the preheater and is discharged therefrom through pipe 28. Thereafter this gas may be recycled to the process or otherwise disposed of.

As will be seen, pipe 26 stems from a 3-way valve 30 which is the terminus for outlet pipes 32 and 34 from calciners 10 and 12, respectively. Additional discharge conduits 36 and 38 are provided in the upper area of the calciners for conducting off waste gases.

At the bottom of the calciners there are provided charge material drawoff conduits 40 and 42, sweep gas conduits 44 and 46 and heating gas conduits 48 and 50 connected through 3-way valve 52 to a source of combustible fuel. Three-way valves 54 and 56 are also provided for charge drawoff conduit and sweep gas conduit, respectively.

At the bottom or discharge end of the system there is provided a cooler 58 which may be similar in design to preheater 22. Sweep gas is introduced into the bottom of the cooler through pipe 60, flows upwardly through the body of charge material entering the cooler through pipe 62, and then passes out through pipe 64 for delivery to whichever of the two calciners 10 and 12 is on stream or for other suitable use. Solid product is withdrawn from the bottom of cooler 58 through conduit 66.

The process as carried out according to the flow diagram previously described will now be discussed in connection with the treatment of Standard Oil Company's fluid coke. This material is in the form of very small pellets, i.e., smaller than about 20-mesh, which in the mass behaves very much like a fluid.

Fluid coke was delivered to preheater 22 and passed in contact with hot gases flowing upward therethrough. Calciner 10 had previously been heated to approximately 2600° F. and the coke, preheated to about 1000° F., was allowed to flow downward through the calciner in a fluidized condition. In the course of its passage through the calciner, the coke was heated to approximately 2600° F. and was thoroughly calcined. Thereafter the coke flowed into cooler 58 where it was passed in contact with inert gas. Inert gas entering the cooler at atmospheric temperature was rapidly heated by the coke, was further heated in the course of its flow through the calciner and was then utilized to preheat the coke.

The process was continued in calciner 10 until the coke temperature as measured at the outlet of the calciner dropped to about 2500° F. whereupon the flow of coke was diverted to calciner 12 which had previously been heated to the same temperature, or 2600° F. During the period of treatment in calciner 12, calciner 10 was reheated to operating temperature. Because of the relatively large heat capacity of the checker brick forming the flues, the coke was heated over a two-hour period in each one of the pair of calciners.

It will be obvious to those skilled in the art that the process of this invention can be made extremely efficient by incorporating therein suitable heat exchangers for utilizing the heat in the heating gases exhausted through flues 36 and 38. With such arrangement it will be noted that the only heat loss is that resulting from radiation from the apparatus components which will, of course, be insulated to minimize such loss.

Another run was made in which coke was first fed to the preheater where it moved downward in a fluidized condition while absorbing heat from the gases leaving the calciner and then passed into the upper section of the calciner where a layer of coke was also maintained in fluidized condition, the layer of coke being supported on the top of the checkerwork by a special layer of checkerbrick having restricted passages which controlled the rate of flow to the larger vertical flues below. The coke then fell freely through the heated refractory flues in the calciner and then passed into the cooler where it was again maintained in a fluidized condition as it flowed downward in contact with inert gas before being discharged. In the course of its free fall through the calciner which provided a residence time of approximately two seconds, the coke was heated to approximately 2400° F. and was thoroughly calcined.

Still another run was made in which the fluid coke was maintained as a column within the flues. Coke was withdrawn at a consistent rate from the bottom of the calciner, as raw coke was delivered to the top thereof from the preheater, so that the flues of the calciner were at all times full. The green fluid coke used in this case had a sulfur content of 6.5%. The residence time of the coke within the calciner was much longer in order to desulfurize the coke as well as effect calcination.

When it is desired to utilize only a completely fluidized system within the calciners, the equipment can be arranged as in Figure 2. As will be seen from Figure 2, in which the apparatus components corresponding to those of Figure 1 have been given the same reference numerals, the coke is delivered to the calciners at the bottom rather than at the top. Consequently, it is necessary that the charge material be conveyed into the calciners in the stream of hot sweep gas in conduit 64. Likewise the treated charge is withdrawn from the top of the calciners through conduits 40 and 42 which connect into the tops of the calciners rather than into the bottoms thereof as shown in Fig. 1 and is delivered to the cooler in the fluidizing gas stream which is shunted into hot gas conduit 64 within the cooler. Inasmuch as fluidization is now so well known in industry, no further description thereof seems necessary in this specification.

It has been suggested above that one important advantage of this invention is in making possible the use of high temperature and corrosion resistant refractories without regard to thermal conductivity. While it is normally preferred to employ such material, it will be understood that other refractories may also be used, at least in certain areas of the calciners. For example, when the process is carried out in a fluid bed, it may be desirable to construct the lower areas of the flues of silicon carbide because of its greater structural strength while utilizing alumina brick in the upper and highest temperature areas. When lower temperatures and non-corrosive atmospheres prevail, it may be possible to use silicon carbide and even silica brick throughout, although the latter has neither good thermal capacity nor resistance to attack by certain gases referred to above at temperatures substantially above 2000° F. A point here made is that because of the nature of my process as compared to prior known processes, substantial economies are effected no matter what the materials of construction.

One of the requirements of the process is that a gas which is compatible, for the purposes of the treatment, with the charge material be circulated therethrough. For example, when treating coke the gas should be inert; when reducing iron oxide, a compatible reducing gas such as hydrogen should be used. Such gas may be obtained as a by-product from the volatiles driven off from the charge material, or it may be nitrogen, carbon monoxide, hydrogen or other hydrogen containing gas, etc. By the same token, unwanted gases must be excluded from the system. For example, the presence of substantial quantities of carbon dioxide and/or water vapor during the calcination of carbonaceous material is undesirable because either causes heat absorbing reactions which have the effect of decreasing the capacity of the apparatus.

It will be obvious, of course, that the charge material must be in a physical condition such that it is either free flowing or fluidizable. The Standard Oil Company's fluid coke is, of course, both. Most solid carbonaceous materials of the sort requiring calcination may be obtained or put into suitable condition for treating according to this invention. Other materials that may be treated according thereto are metal oxides, natural metallic ores, minerals, and the like.

It will be understood by those versed in the art of high temperature materials treating that various modifications of the illustrated apparatus can be employed for the practice of the process of this invention. For example, the preheater, calciner, and cooler may be combined in one structure, and the various zones controlled processwise as if they were separated, as illustrated in Figures 1 and 2. Further, the calciner section may be subdivided internally into subzones for heating to different temperatures in order to take advantage of the characteristics of various types of refractory bricks. These zones can be heated separately if desired, and can be of any practical size compatible with good mechanical design.

Having thus described my invention, I claim:

1. A process for heat-treating particulate solid materials which comprises flowing said materials in substantially straight-line flow through a treating zone bounded by radiant heat stored from a previous step while flowing a compatible gas in contact seriatim with treated material, with material being treated and with untreated material whereby to cool the treated material, to heat the gas and to preheat the untreated material.

2. A process for treating particulate solid materials at elevated temperatures which comprises, in continuous repetition of a cycle, internally heating the walls of an unobstructed, vertically disposed flue to a predetermined temperature, discontinuing said heating, flowing a particulate solid material and a compatible gas through said flue and heating same by radiation from said flue walls, continuing the flow thereof until the temperature of the treated material at the point of discharge therefrom falls to a predetermined value, discontinuing the flow of solid material and gas, and reheating the walls of the flue.

3. The process of claim 2 in which the gas is flowed countercurrent to the flow of solid material.

4. The process of claim 2 in which the gas is flowed concurrent with the flow of solid material.

5. The process of claim 2 further characterized by flowing the gas in contact with solid material initially after discharge from and finally prior to introduction into said flue.

6. The process of claim 2 in which the solid material is maintained in columnar flow through said flue.

7. The process of claim 2 in which the solid material is flowed in free fall through said flue.

8. The process of claim 2 in which the solid material is maintained in fluid flow through said flue.

9. The process of claim 2 in which the solid material is maintained in upward hyperflow by pressure exerted behind the mass thereof through said flue.

10. The process of claim 2 in which the solid material is carbonaceous and the gas is a gas substantially inert thereto.

11. The process of claim 2 in which the solid material is noncarbonaceous and the gas is a gas reactive therewith.

12. A process for treating particulate solid materials capable of movement through vertically disposed conduits which comprises flowing a particulate solid material vertically through a preheating zone, then through a treating zone, the walls of which having previously been heated to a selected treating temperature, then through a cooling zone, flowing a compatible gas in contact with said solid material, first through said cooling zone, then through said treating zone and finally through said preheating zone, continuing the flow of solid material and gas until the walls of the treating zone have been cooled by radiation of heat therefrom to the solid material to a predetermined temperature as ascertained by the temperature of the solid material thereby heat treated at the treating zone outlet, then discontinuing the flow of said solid material and gas, heating the walls of said treating zone internally to said first selected treating temperature, then discontinuing the internal heating and resuming the flow of solid material and gas.

References Cited in the file of this patent

UNITED STATES PATENTS

| Number | Name | Date |
| --- | --- | --- |
| Re. 17,182 | McEwen | Jan. 1, 1929 |
| 214,147 | Hunt | Apr. 8, 1879 |
| 761,763 | Croizier | June 7, 1904 |
| 1,055,837 | Toogood | Mar. 11, 1913 |
| 1,818,912 | Trent | Aug. 11, 1931 |
| 1,939,457 | Merkel | Dec. 12, 1933 |
| 1,958,918 | Karrick | May 15, 1934 |
| 2,214,672 | Housen | Sept. 10, 1940 |
| 2,313,764 | Otto | Mar. 16, 1943 |
| 2,393,636 | Johnson | Jan. 29, 1946 |
| 2,560,767 | Huff | July 17, 1951 |
| 2,683,023 | Ulander | July 6, 1954 |
| 2,689,787 | Ogorzaly | Sept. 21, 1954 |
| 2,704,242 | Strauss | Mar. 15, 1955 |